Feb. 1, 1966   J. FAISANDIER   3,232,599
OIL-PNEUMATIC SUSPENSION DEVICE
Filed Nov. 17, 1961
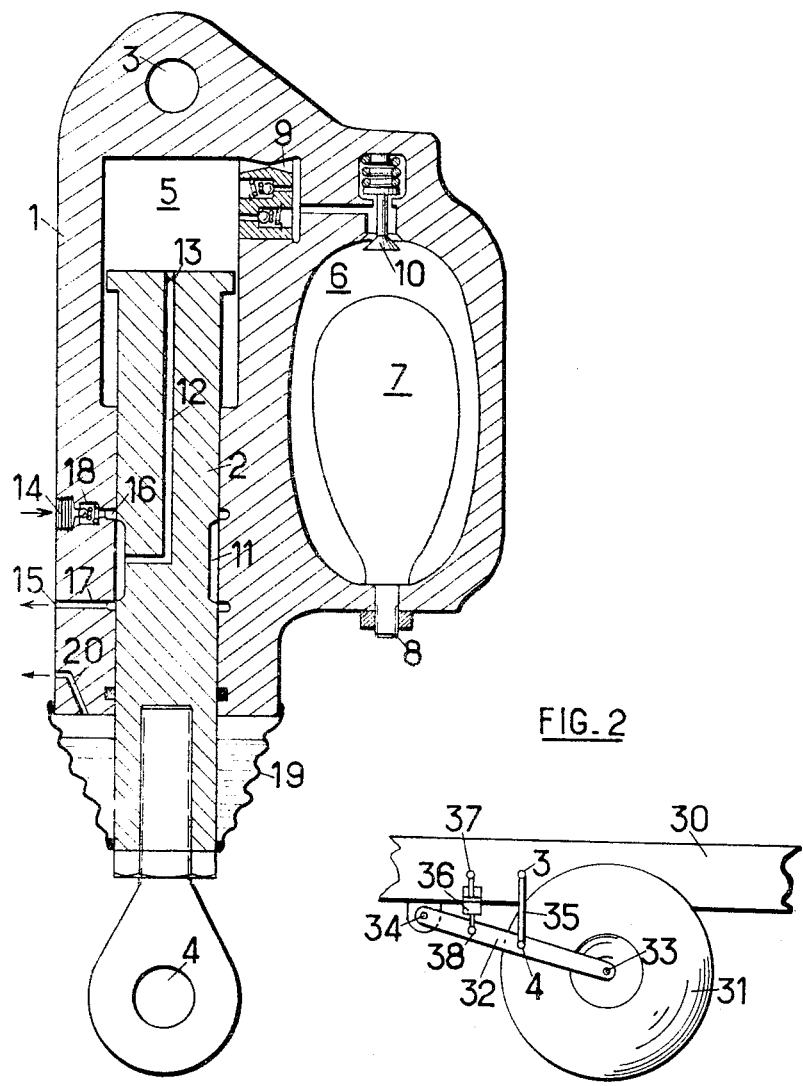
FIG_1
FIG_2

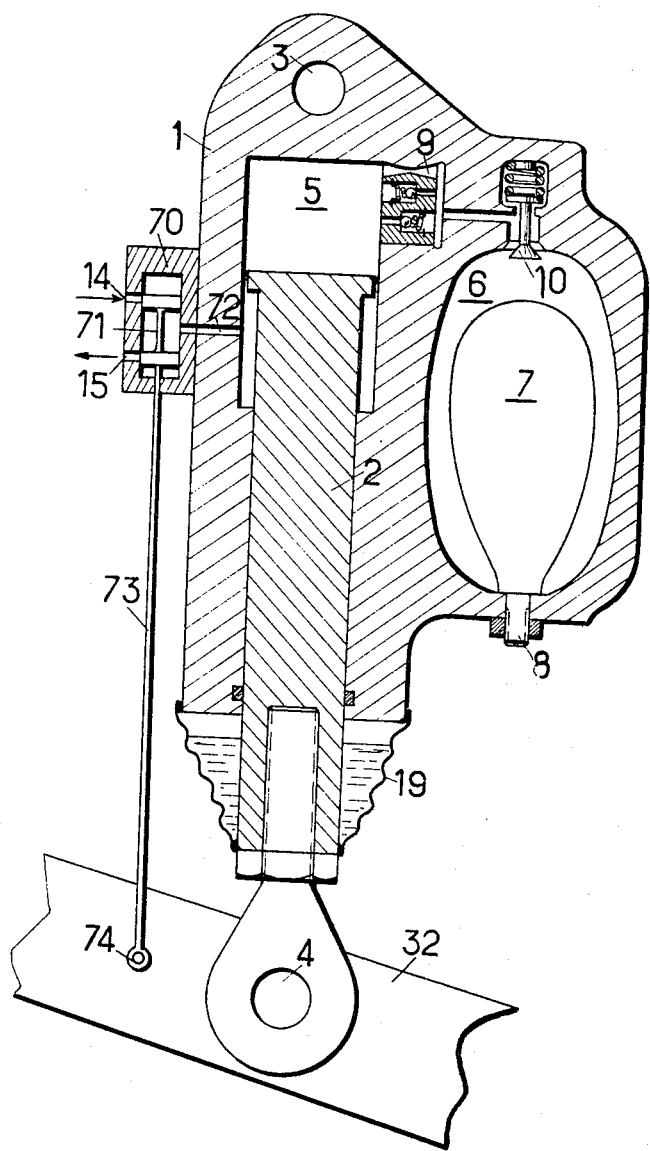

United States Patent Office 3,232,599
Patented Feb. 1, 1966

3,232,599
OIL-PNEUMATIC SUSPENSION DEVICE
Jacques Faisandier, 32 Blvd. Felix Faure, Chatillon-sous-Bagneux, Seine, France
Filed Nov. 17, 1961, Ser. No. 153,149
Claims priority, application France, Nov. 24, 1960, 844,852
2 Claims. (Cl. 267—64)

The invention relates to a fluid actuated suspension assembly for supporting a load.

More particularly, the present invention relates to a fluid actuated suspension assembly for supporting a load comprising in combination a cylinder, a piston movable in the cylinder with the cylinder and piston defining at least one working space adapted to contain hydraulic fluid, a chamber adapted to contain hydraulic fluid and communicating with the working space, a vessel in the chamber adapted to have a variable volume and contain a compressible fluid and also be acted upon by hydraulic fluid from the working space, a source of hydraulic pressure fluid, a valve chamber, a valve member movable in the valve chamber for controlling the supply of pressure fluid, and operating means responsive to relative movement of the cylinder and piston for automatically operating the valve member in accordance with relative movement of the cylinder and piston whereby on variation of the load, the valve mmeber is operated to effect introduction or discharge of hydraulic fluid into or from the assembly for increasing or decreasing the hydraulic fluid pressure therein for restoring the cylinder and piston to their predetermined relative position.

A known embodiment appears as a combination of a pneumatic suspension device and a pneumatic shock absorber.

This invention has as an object to provide an assembly including the combination of a pneumatic suspension unit and a hydraulic shock absorber.

Further objects of the invention include several embodiments in which the pump and/or the valve distributor may be disposed internally relative to the cylinder of the assembly.

Figure 3:
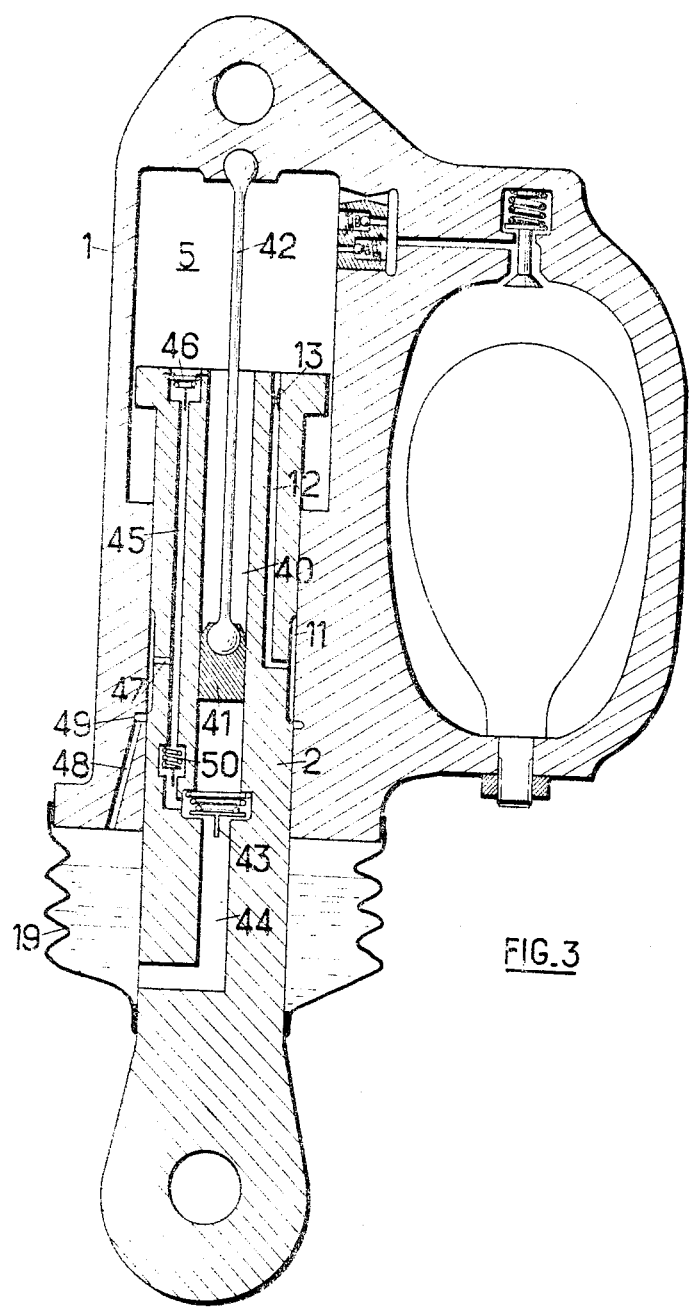
Figure 4:
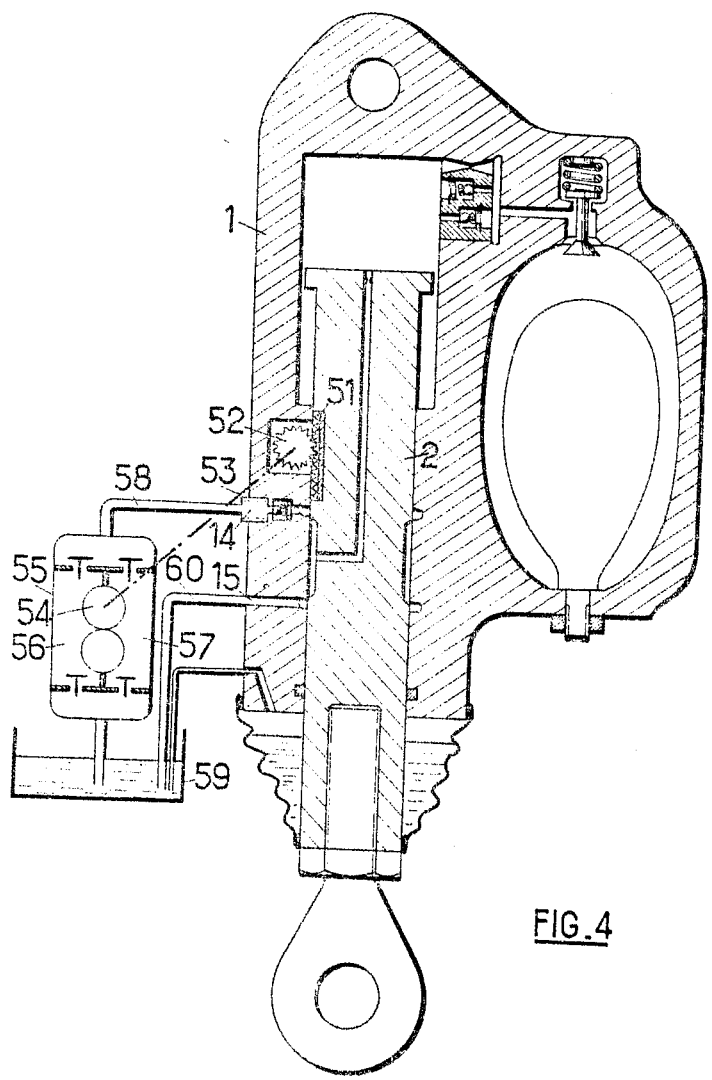

Non-limitative embodiments of the invention are hereinafter described with reference to the accompanying drawings wherein:

FIGURE 1 shows diagrammatically an embodiment of the invention with an internal distributor and external pressure source, FIGURE 2 shows diagrammatically a particular arrangement of the shock absorber and of the external pump, FIGURE 3 shows an emobdiment with internal pressure source and distributor, FIGURE 4 shows an embodiment with the external pressure source taking its energy from the energy which is to be damped, FIGURE 5 shows an embodiment with external distributor and pressure source.

In FIGURE 1 the shock-absorber body or the external part is indicated by 1, and the piston or internal part by 2.

The body is connected to the vehicle by any suitable fixing means, for example the eye 3; the piston or plunger 2 is connected to the wheel by any suitable fixing means e.g. the eye 4.

In the body is provided a chamber 5 in which reciprocates the top end of the plunger 2.

This chamber communicates at its top part with a second chamber 6 which contains a vessel 7 filled with gas; this vessel can be filled via the orifice 8 which is normally closed by any suitable means.

Communication between the chambers 5 and 6 is ensured by means of an energy-absorbing device 9 represented in the drawing by a conventional device comprising two one-way valves acting in different directions but this device can be replaced by any other known energy-absorbing device.

Further, in the passage by which the chambers 5 and 6 communicate is located the valve 10, which is the valve usually found in vessel accumulators, it ensures the support of the vessel in the absence of external pressure.

The distributor device contained in the plunger 2 is constituted by an annular groove 11 arranged at the periphery of this plunger.

This groove communicates with the chamber 5 via the pipe 12 arranged in the plunger, this pipe comprising a restricted orifice 13.

The pressure source (not shown) can be a pump driven by the vehicle motor. The pressure medium arrives by 14, and, on its way to the tank, proceeds via 15 and the respective ducts 16 and 17, duct 16 containing a one-way valve 18.

The distance between ducts 16 and 17 is such that, in the half-way position of the plunger 2, they are both blocked off as shown in the drawing.

A bellows 19 recovers oil leakages which can return to the tank by way of duct 20.

The manner of operation is as follows:

If the plunger 2 goes down too far in the body 1, then the mouth of duct 16 is uncovered and the pressure source feeds chamber 5 with pressurised liquid until the plunger again assumes the neutral position shown. If on the other hand the plunger does not pass far enough down into the body 1, the mouth of duct 17 is uncovered and the liquid from chamber 5 discharges into the tank until the plunger assumes the position shown.

The restricted orifice 13 must be sufficiently small for these filling and emptying operations to have no effect on the oscillations due to the state of the road.

On the other hand if the plunger only sinks down to a half-way position between the above-defined extremes, then the restricted orifice will act with a time constant relatively large with respect to that of the oscillations due to the state of the road.

The vessel 7 can be replaced by any other compressible container, for example by a closed cellular body or by a space variable by means of a floating piston.

In FIGURE 2 is shown the arrangement of the shock absorber and of the pressure source on a vehicle.

30 indicates the chassis of the vehicle, 31 the vehicle wheel and 32 an arm fixed at 33 to the wheel axle so that the wheel can turn independently of the arm, and the arm 32 is fixed to the chassis at 34 by any suitable articulated connecting means.

35 indicates generally the shock absorber which is connected to the chassis at 3 and to the arm 32 at 4.

36 designates the pressure source, shown by way of example as a piston pump and being fixed to the chassis at 37 and to the arm 32 at 38, the relative movement of points 3 and 4 ensuring the functioning of the shock-absorbing device.

This example thus illustrates the use of part of the energy to be damped for actuating the pump.

In FIGURE 3 is illustrated a device wherein the source of pressure is an internal one. The same reference symbols are used in this figure as for corresponding parts in FIGURE 1.

In FIGURE 3 the plunger 2 acting as pump body is provided with an internal cylinder 40 in which reciprocates a piston 41 whose rod 42 is integral with body 1.

43 designates the suction valve which can shut the duct 44 which communicates with the tank 19.

The liquid is upwardly thrust into chamber 5 by way of duct 45 which opens into said chamber 5. At the mouth of duct 45 on the face of the plunger 2 is located the one-way valve 46.

The groove 11 communicates with chamber 5 by way of duct 12 and restricted orifice 13. The groove 11 also communicates with duct 45 via duct 47. 48 indicates the duct permitting delivery of liquid to the tank when the groove 11 is located opposite the mouth 49 of duct 48 in the cylinder in which reciprocates plunger 2. 50 designates a conventional delivery valve.

The manner of operation is as follows:

When in consequence of the movement relative to oscillations due to the condition of the road the plunger 2 reciprocates in the body 1, the piston 41 alternately sucks liquid by way of duct 44 and thrusts it into chamber 5 by way of duct 45 if the orifice 49 is blocked off by plunger 2.

If on the contrary the duct has free access to the groove 11, the liquid is thrust directly to the tank via 45, 47 and 48.

With this difference the general manner of operation is the same as in the case of FIGURE 1, i.e. if in the intermediate position of the plunger 2 the groove 11 is isolated from the tank, then all the oil is thrust into the compression chamber 5 and the vehicle is raised until, in the intermediate position, the mouth 49 is located opposite the groove 11. The operation is the reverse in the case when—in the intermediate position of the plunger 2—the mouth 49 is above the groove 11.

In FIGURE 4 the general arrangement is the same as in FIGURE 1. Plunger 2 has at its periphery a longitudinal groove in which is accommodated a rack 51.

In the body 1 is the toothed wheel 52 disposed in a suitable recess and whose teeth extend a small distance into the groove in the plunger 2, so as to be engaged by the teeth of the rack 51.

To the axle 53 of wheel 52 is keyed the control wheel 54 of a gear pump generally indicated by reference 55.

This pump 55 can be accommodated in the body 1 or can be arranged exterior thereto. According to a conventional arrangement it comprises two chambers 56 and 57 and 4 valves so arranged that the thrust of the liquid is unidirectional and takes place by way of pipe 58, whatever the relative direction of movement of the plunger 2 in the body 1.

Pipe 58 is connected to the inlet 14 of the pressure medium if the pump is externally disposed, the return of the medium to the tank 59 taking place by way of pipe 60 connected to outlet 15.

In FIGURE 5 the same device as in FIGURE 1 is shown with the pressure source (not shown) arranged externally; this pressure source for example can be mounted as in FIGURE 2 but with an external distributor 70. The reference symbols used in FIGURES 1 and 2 are used to indicate similar elements.

The distributor 70 is integral with the body 1 and is disposed exterior thereto. It is a conventional distributor with slide valve 71 and 3 distributing ducts, centre closed; duct 72 establishes communication between the interior chamber, defined by the slide valve, and the chamber 5 in which the plunger 2 reciprocates with clearance, and also with the duct 14 for arrival of the pressure and duct 15 for its discharge to the tank.

The shock absorber is fixed by eye 3 to the chassis and is articulated to the arm 32 by eye 4 as in FIGURE 2.

The rod 73 of the slide valve 71 is itself articulated at 74 to the arm 32.

The manner of operation is the same as in the arrangement shown in FIGURE 1 and can be described in the same terms.

The clearance of the plunger 2 here replaces the constricted or throttle orifice 13 of FIGURE 1, but this is only an optional variant.

Naturally FIGURE 5, being purely diagrammatic does not claim to represent in exact manner the relation which should exist between the reciprocation of the plunger 2 and that of the slide valve 71. The transmission ratio can be varied by modifying the manner of transmission diagrammatically represented by the arm 73 and its point of articulation 74.

What I claim is:

1. A fluid actuated suspension assembly for supporting a load comprising in combination a cylinder, a piston movable in said cylinder with said cylinder and piston defining at least one working space adapted to contain hydraulic fluid, means defining a chamber adapted to contain hydraulic fluid, duct means providing communication between said chamber and working space and having an energy absorbing device, a vessel in said chamber adapted to have a variable volume and contain a compressible fluid and be acted upon by the hydraulic fluid from said working space, a source of hydraulic pressure fluid, a valve chamber connected to said source for the flow of fluid into and out of said working space, a valve member movable in said valve chamber for controlling the supply of pressure fluid to and from said working space, means defining a restricted passageway through which the valve chamber communicates with said working space for limiting flow, and operating means responsive to relative movement of said cylinder and piston for automatically operating the valve member in accordance with the relative movement of the cylinder and piston whereby on variation of the load, said valve member is operated to effect introduction or discharge of hydraulic fluid into or from said assembly for increasing or decreasing the fluid pressure therein for restoring said cylinder and piston to their predetermined relative position.

2. The fluid actuated suspension assembly as claimed in claim 1 wherein said source of pressure fluid, valve chamber and valve member are located exteriorly of said cylinder.

References Cited by the Examiner

UNITED STATES PATENTS

| 1,291,016 | 1/1919 | Kellogg. | |
|---|---|---|---|
| 1,437,894 | 12/1922 | Holmes | 267—64 |
| 2,436,573 | 2/1948 | Heynes | 267—64 |
| 2,592,391 | 4/1952 | Butterfield. | |
| 2,620,182 | 12/1952 | Marston et al. | |
| 2,756,046 | 7/1956 | Lucien. | |
| 2,987,311 | 6/1961 | Schilling et al. | 267—64 |
| 2,992,836 | 7/1961 | Vogel. | |
| 2,998,243 | 8/1961 | Schultz | 267—64 |
| 3,033,556 | 5/1962 | Wossner | 267—64 |
| 3,051,507 | 8/1962 | Fiala | 267—64 |
| 3,085,796 | 4/1963 | Wettstein | 267—64 |

FOREIGN PATENTS

| 536,263 | 5/1941 | Great Britain. |
| 828,349 | 2/1960 | Great Britain. |
| 849,342 | 9/1960 | Great Britain. |

ARTHUR L. LA POINT, *Primary Examiner.*